United States Patent [19]

Swasey

[11] Patent Number: 4,506,727
[45] Date of Patent: Mar. 26, 1985

[54] CONVERTED TEMPERATURE CONTROL ROLL

[75] Inventor: Archie N. Swasey, Oxford, Conn.

[73] Assignee: USM Corporation, Farmington, Conn.

[21] Appl. No.: 388,418

[22] Filed: Jun. 14, 1982

[51] Int. Cl.³ .............................................. F28D 11/02
[52] U.S. Cl. ..................................................... 165/90
[58] Field of Search ............... 165/89, 90, 91; 34/119, 34/124

[56] References Cited

U.S. PATENT DOCUMENTS

| | | | |
|---|---|---|---|
| 2,712,924 | 7/1955 | Nicolai | 165/89 |
| 2,890,026 | 6/1959 | Marganski et al. | 165/89 |
| 3,228,462 | 1/1966 | Smith, Jr. | 165/89 |
| 3,834,205 | 9/1974 | Maag et al. | 165/90 X |
| 3,838,734 | 10/1974 | Kilmartin | 165/90 |
| 4,050,510 | 9/1977 | Theysohn | 165/89 |
| 4,077,466 | 3/1978 | Fleissner | 165/89 |
| 4,090,553 | 5/1978 | Beghin | 165/89 |
| 4,252,184 | 2/1981 | Appel | 165/90 |

Primary Examiner—Sheldon J. Richter
Attorney, Agent, or Firm—Vincent A. White

[57] ABSTRACT

A method for converting and a converted cored roll having temperature control means including a central tube isolating the roll core, passages extending lengthwise of the roll in a circular pattern in the annular area between the core and the roll working surface, caps connecting certain passages to form tortions paths, pipes leading from the ends of the paths to the tube and baffle means separating the tube into inlet and outlet areas for circulating temperature control fluid.

1 Claim, 4 Drawing Figures

4,506,727

CONVERTED TEMPERATURE CONTROL ROLL

BACKGROUND OF THE INVENTION

1. Field of the Invention

This invention relates to conversion of cored rolls to more efficient drilled rolls in which the roll temperature is controlled by fluid circulated adjacent the working surface.

2. Description of the Prior Art

As shown in U.S. Pat. No. 2,890,026 to Marganski et al it is known to control the temperature of the working surface of a roll by circulating fluid through passages in the roll closely adjacent to the working surface. The fluid usually enters a central bore and is distributed to one end of each of a set of connected passages. By a suitable baffle means in the central bore, the fluid is directed through an outlet. The advantages of such temperature controlled rolls are well known and include the ability to precisely control a high rate of heat transfer between the working surface of the roll and material being processed. This results in a more efficient roll operation and a higher degree of smoothness and gloss when used, for example, in a paper calendar. In the past such as before 1960 it was common to circulate temperature control fluid in rather large cores or bores centrally located in rolls. However, the heating or cooling temperature of the fluid was transmitted to the working surface of the roll through the substantial thickness between the core and the surface. Reducing such thickness to improve heat transfer would have substantially changed the flex characteristics of the roll. With the advent of the so-called "drilled roll" of the above patent the cored rolls were acknowledged to be less efficient. While a solid roll easily could be drilled adjacent the periphery and bored along the roll axis for conversion to the more efficient roll, it was impractical to convert the cored rolls. Thus, many less efficient cored rolls remain in production or are scrapped and replaced with a costly new "drilled roll".

Thus, it is an object of the present invention to convert cored rolls to "drilled rolls" in a manner which has been estimated to be approximately one-half the cost of a new drilled roll.

SUMMARY OF THE INVENTION

To achieve the object of the invention the ends of the journal areas of a cored roll are bored to receive the ends of a tube which extends through the larger core. The annular area of the roll between the core and the working surface of the roll is drilled with a plurality of passages which extend lengthwise through the ends of the roll in a circular pattern closely underlying the working surface. Angular holes are drilled through the ends of certain of the passages and into the end areas of the tube and pipes are inserted to connect the passages to the inside of the tube isolating the core. Caps seal the ends of the passages and through appropriate grooves connect adjacent passages to form tortuous paths extending from the tube, back and forth under the working surface and back to the tube. A suitable baffle means divide the tube into inlet and discharge areas and connections are provided through a rotary fitting to an inlet and outlet. In this manner a cored roll rather then be discarded at considerable loss can be converted into a more efficient drilled roll taking full advantage of good temperature control and heat transmission.

DESCRIPTION OF THE PREFERRED EMBODIMENTS

Figure 1:
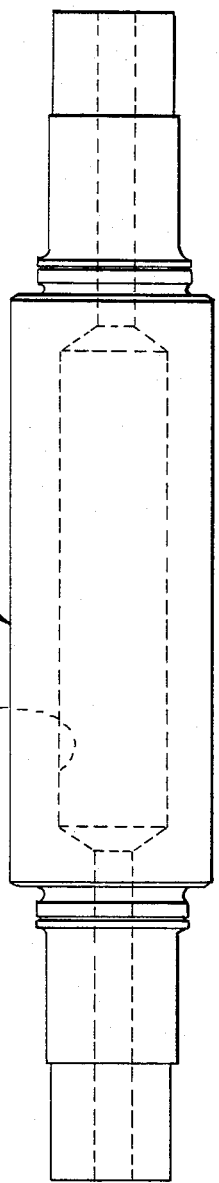
FIG. 1 is a side view of the type of cored roll to be converted.
Figure 2:
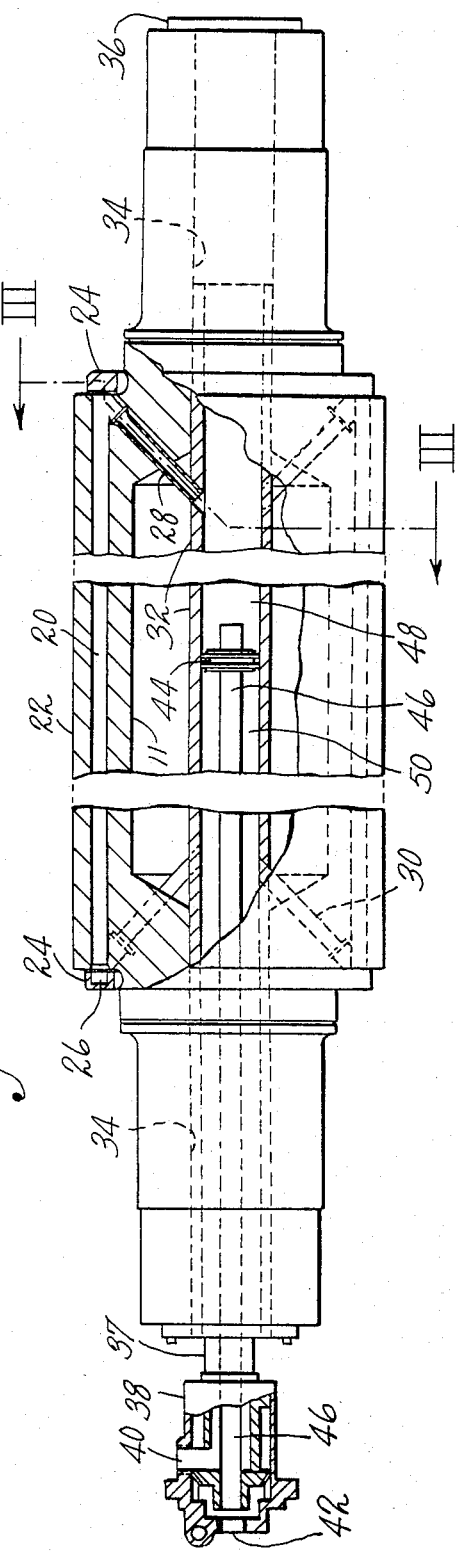
FIG. 2 is a side elevation partly in section showing the cored roll after conversion to a drilled roll.
Figure 4:
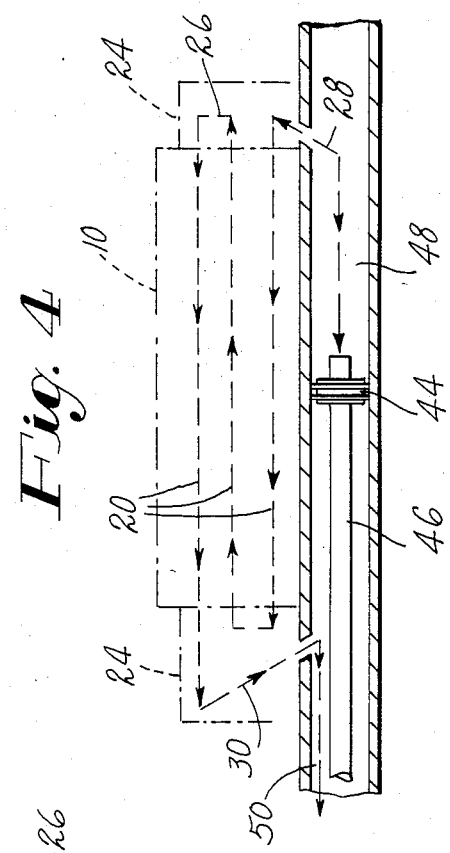
FIG. 4 is a diagramatic view showing the path of temperature controlled fluid through the converted roll.
Figure 3:
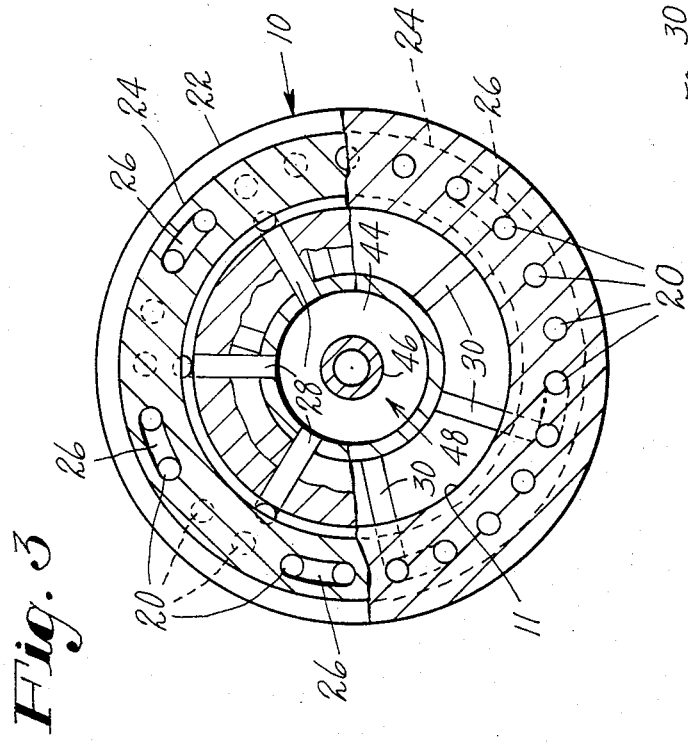
FIG. 3 is a section on line III—III of FIG. 2.

Referring to FIG. 1 there is shown a so called bored or cored roll 10 having a central core 11 in which temperature control fluid is usually circulated. For converting such rolls to the more efficient so called drilled rolls of the type shown in U.S. Pat. No. 2,890,026 the roll is provided with a plurality of passages 20 (FIG. 2) which extend lengthwise through opposite ends of the roll. As best seen in FIG. 3, the passages 20 are arranged in a circular pattern concentric with and closely adjacent the working surface 22 of the roll. Caps 24 at opposite ends of the roll close the ends of the passages and by means of grooves 26 certain adjacent passages are connected to provide continuous tortuous passages back and forth along the length of the roll as best seen in FIG. 4. Certain other passages 20 are connected by pipes 28 or 30 to a tube 32. The roll is provided in the journal areas opposite ends with bores 34 to receive opposite ends of the tube 32. The tube may closely fit the bores 34 or may be sealed by means not shown to prevent leakage of temperature control fluid. The tube is closed at one end such as by a cap 36 and extends through the core 11 to isolate and limit the volume of fluid necessary to control the temperature of the roll surface. The other end of the tube 32 is connected through a tube 37 to a fitting 38 having an outlet 40 and an inlet 42. The fitting 38 preferably is fixed and rotatably receives the tube 37. A baffle 44 mounted on one end of a tube 46 separates the central tube 32 into inlet and outlet areas 48 and 50 respectively. As seen in FIG. 2, the tube 46 leading from the area 48 communicates with the inlet 42. The discharge area 50 is connected to the outlet 40 through the tube 37.

The inlet area 48 of the tube 32 is connected by pipes 28 to the ends of the sets of connected passages 20 at the right end of the roll while the discharge area 50 is connected by pipes 30 to the left ends of each set of connected passages 20. In this manner fluid at the proper temperature enters the fitting 38 through the inlet 42 and passes through the tube 46 to the inlet area 48 and through the pipes 28 to the right ends of each set of connected passages 20. After passing through the connected passages to impart the proper temperature to the roll surface 22, the fluid is fed through pipes 30, the discharge area 50, the tube 37 to outlet 40 of the fitting 38. The inlet and outlet 40, 42 may be connected to suitable heat exchange means of any well-known types, not shown, to control the temperature of the fluid.

According to the method of converting cored or bored rolls to a more efficient drilled roll in the most economical manner, the core 11 is isolated from the fluid path reducing the volume of temperature control fluid needed. To this end, the journal areas of the roll are suitably bored to receive the ends of the tube 32. As noted above, the tube may closely fit the bores 34 or suitable sealing means, not shown but such for example "O" rings or packing or securement such as brazing, could be used to avoid leakage of the temperature control fluid. One end of the tube 32 is closed as by cap 36 and the other end communicates with the tube 37. Since the roll is rotated while the fluid enters through the fixed fitting 38 the fitting may rotatably receive the tube 37 which is fixed in the end of bore 34 of the roll or the fitting may be fixed on tube 37 which rotates in the bore 34 without departing from the scope of the invention. Either way suitable sealing means are provided to avoid fluid leakage.

The annular portion of the roll between the core 11 and the roll surface 22 has formed therein such as by drilling the passages 20. The ends of the rolls are bored at angles intersecting certain passages and the tube 32 to receive the pipes 28 and 30 which are suitably sealed and secured to avoid fluid leakage. The caps 24 connect adjacent passages 20 and at opposite ends connect the ends of each set of connected passages through pipes 28, 30 to the inlet and discharge areas 48, 50 of the tube 32.

It should be obvious that various means of forming the passages 20 and sealing the tubes and pipes may be provided without departing from the scope of the invention as defined in the claims.

I claim:

1. A roll having a solid portion providing a cylindrical work surface and having a central enlarged coaxial core, and having coaxial journal portions extending from opposite ends of the solid cored portion, said roll being converted to provide temperature control means including spaced passages extending lengthwise from end to end through the solid portion in a coaxial circular pattern between the working surface and the core, pipes each extending from one end of a particular passage inwardly into the core, a tube supported in the journal portions and extending coaxially through the core and having a baffle isolating opposite ends of the tube into an inlet end and a discharge end, the pipes each connecting one end of each particular passage through the core to one end of the tube, an annular cap at each end of the working surface solid portion of the roll covering the ends of the passages, the caps each having grooves connecting pairs of adjacent passages, the arrangement being adapted to conduct fluid from the inlet end of the tube through the pipes to one end of certain passages, through the certain passages to the opposite end of the roll, through the grooves in the cap at the opposite end of the roll to adjacent passages to the one end of the roll and through grooves in the cap at said one end to the next adjacent passages to the opposite end of the roll and thence through the pipes to the discharge end of the tube.

* * * * *